(12) United States Patent
Spyra et al.

(10) Patent No.: US 11,680,511 B2
(45) Date of Patent: Jun. 20, 2023

(54) CYLINDER HEAD FOR AN INTERNAL COMBUSTION ENGINE

(71) Applicant: INNIO Jenbacher GmbH & Co OG, Jenbach (AT)

(72) Inventors: Nikolaus Spyra, Innsbruck (AT); Herbert Schaumberger, Munster (AT); Matthias Grotz, Innsbruck (AT); Isabelle Bec, Innsbruck (AT); Thomas Fankhauser, Finkenberg (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 17/416,517

(22) PCT Filed: Dec. 19, 2019

(86) PCT No.: PCT/AT2019/060444
§ 371 (c)(1),
(2) Date: Jun. 21, 2021

(87) PCT Pub. No.: WO2020/124117
PCT Pub. Date: Jun. 25, 2020

(65) Prior Publication Data
US 2022/0074341 A1    Mar. 10, 2022

(30) Foreign Application Priority Data
Dec. 21, 2018   (AT) .................. GM 50265/2018

(51) Int. Cl.
*F02B 19/12* (2006.01)
*F02B 19/10* (2006.01)
(Continued)

(52) U.S. Cl.
CPC .......... *F02B 19/12* (2013.01); *F02B 19/1014* (2013.01); *F02B 19/1028* (2013.01);
(Continued)

(58) Field of Classification Search
None
See application file for complete search history.

(56) References Cited

U.S. PATENT DOCUMENTS 4,969,432 A * 11/1990 Scharnweber ..... F02M 21/0275
123/538
5,024,193 A * 6/1991 Graze, Jr. ........... F02B 19/1023
123/259

(Continued)

FOREIGN PATENT DOCUMENTS

AT           13172 U1 *  5/2013  ............... F02B 19/08
AT         516618 B1 *  7/2016  ............ A01C 17/006
(Continued)

OTHER PUBLICATIONS

PCT International Search Report and Written Opinion; Application No. PCT/AT2018/060315; dated Jul. 16, 2019; 12 pages.
(Continued)

*Primary Examiner* — Kevin R Steckbauer
(74) *Attorney, Agent, or Firm* — Fletcher Yoder, P.C.

(57) ABSTRACT

A cylinder head for an internal combustion engine comprising a prechamber (3), wherein a prechamber gas valve (5) is fitted into a cavity of the cylinder head (2) and the prechamber gas valve (5) is connected to the prechamber (3) by way of a flow transfer passage (10), wherein the flow transfer passage (10) for a given cross-sectional area immediately downstream of the prechamber gas valve (5) is of such a length that in operation of the cylinder head (2) mounted in an internal combustion engine in a compression stroke of the combustion process propellant gas which flow out of the prechamber gas valve (5) forms a gas cushion at least in a first portion (8) of the flow transfer passage (10), that adjoins the prechamber gas valve (5).

19 Claims, 6 Drawing Sheets

B - B

(51) Int. Cl.
*F02B 19/18* (2006.01)
*F02M 21/02* (2006.01)

(52) U.S. Cl.
CPC ......... *F02B 19/18* (2013.01); *F02M 21/0218* (2013.01); *F02B 2201/04* (2013.01)

(56) References Cited

U.S. PATENT DOCUMENTS

| | | | |
|---|---|---|---|
| 7,950,364 B2* | 5/2011 | Nerheim | F02B 19/1014 123/259 |
| 9,151,212 B2* | 10/2015 | Dumser | F02M 21/0281 |
| 9,371,771 B2* | 6/2016 | Lee | F02M 21/0275 |
| 9,458,798 B2 | 10/2016 | Mitter et al. | |
| 9,581,119 B2* | 2/2017 | Terakado | F02B 19/108 |
| 9,816,430 B2* | 11/2017 | Yuuki | F02M 21/0281 |
| 9,982,588 B2 | 5/2018 | Schafer | |
| 10,100,714 B2* | 10/2018 | Jacob | F02B 19/1033 |
| 10,208,651 B2* | 2/2019 | Tozzi | F02B 19/18 |
| 10,662,865 B2* | 5/2020 | Graham | F02B 19/16 |
| 2010/0132660 A1 | 6/2010 | Nerheim | F02B 19/1014 123/260 |
| 2014/0165958 A1* | 6/2014 | Lee | F02B 19/12 123/260 |
| 2014/0251259 A1* | 9/2014 | Dumser | F02M 21/0281 123/260 |
| 2015/0028239 A1* | 1/2015 | Terakado | F02B 19/108 251/129.15 |
| 2016/0252006 A1* | 9/2016 | Jacob | F02B 19/12 123/266 |
| 2016/0363041 A1 | 12/2016 | Moffat et al. | |
| 2017/0167359 A1* | 6/2017 | Maier | F02B 19/18 |
| 2017/0226922 A1* | 8/2017 | Tozzi | F02M 21/0218 |
| 2018/0058305 A1* | 3/2018 | Graham | F02B 19/00 |
| 2021/0189946 A1* | 6/2021 | Schock | F02B 19/1028 |
| 2022/0056836 A1* | 2/2022 | Grotz | F02B 19/108 |
| 2022/0074341 A1* | 3/2022 | Spyra | F02B 19/1014 |

FOREIGN PATENT DOCUMENTS

| | | | | |
|---|---|---|---|---|
| AT | 16719 U1 | * | 7/2020 | .......... F02B 19/1004 |
| CN | 2908805 Y | * | 6/2007 | |
| CN | 104040137 A | * | 9/2014 | ............. F02B 19/08 |
| CN | 105525981 A | * | 4/2016 | .......... F02B 19/1004 |
| CN | 105525982 A | * | 4/2016 | .......... F02B 19/1004 |
| DE | 102005005851 A1 | | 8/2006 | |
| DE | 102016209922 A1 | * | 12/2017 | ............. F02B 19/108 |
| DE | 102020007673 A1 | * | 6/2021 | ............. F02B 19/10 |
| EP | 2700796 A1 | * | 2/2014 | ............. F02B 19/108 |
| EP | 3012431 A1 | | 4/2016 | |
| EP | 3012431 A1 | * | 4/2016 | .......... F02B 19/1004 |
| EP | 3012444 | | 4/2016 | |
| EP | 3012444 A1 | * | 4/2016 | .......... F02B 19/1004 |
| EP | 2700796 B1 | * | 8/2016 | ............. F02B 19/108 |
| EP | 3061939 A1 | | 8/2016 | |
| EP | 3064755 A1 | * | 9/2016 | ........... A01C 17/006 |
| EP | 3064755 A1 | | 9/2016 | |
| EP | 3203050 A1 | | 8/2017 | |
| EP | 3203050 A1 | * | 8/2017 | ............. F02B 19/08 |
| EP | 3012431 B1 | * | 11/2017 | .......... F02B 19/1004 |
| EP | 3255744 A1 | * | 12/2017 | ............. F02B 19/108 |
| EP | 3255744 A1 | | 12/2017 | |
| EP | 3012444 B1 | * | 6/2018 | .......... F02B 19/1004 |
| EP | 3064755 B1 | * | 12/2018 | ........... A01C 17/006 |
| EP | 3203050 B1 | * | 4/2019 | ............. F02B 19/08 |
| EP | 3255744 B1 | * | 6/2020 | ............. F02B 19/108 |
| GB | 2545478 A | | 6/2017 | |
| JP | H0465922 U | | 6/1992 | |
| JP | 2008169706 A | * | 7/2008 | |
| JP | 2011149308 A | * | 8/2011 | |
| JP | 2021099102 A | * | 7/2021 | ............. F02B 19/10 |
| WO | WO-2006043818 A1 | * | 4/2006 | .......... F02B 19/1014 |
| WO | WO-2013012258 A2 | * | 1/2013 | ............. F02B 19/12 |
| WO | WO-2020124102 A1 | * | 6/2020 | .......... F02B 19/1014 |
| WO | WO-2020124117 A1 | * | 6/2020 | .......... F02B 19/1004 |

OTHER PUBLICATIONS

PCT International Search Report and Written Opinion; Application No. PCT/AT2019/060444; dated Feb. 25, 2020; 10 pages.
U.S. Appl. No. 17/416,424, filed Jun. 18, 2021, Matthias Grotz.

* cited by examiner

A-A

B - B

B - B

B - B

CYLINDER HEAD FOR AN INTERNAL COMBUSTION ENGINE

CROSS-REFERENCE TO RELATED APPLICATIONS

This application is a National Stage entry from, and claims benefit of, PCT Application No. PCT/AT2019/060444, filed on Dec. 19, 2019; entitled "CYLINDER HEAD FOR AN INTERNAL COMBUSTION ENGINE", which claims priority to Austrian Application No. GM 50265/2018, filed Dec. 21, 2018, which are herein incorporated by reference in their entirety.

BACKGROUND

The present invention concerns a cylinder head and an internal combustion engine having such a cylinder head.

As from a certain diameter of the cylinder bore (about 150 mm), (gas) internal combustion engines are equipped with a prechamber for ignition boosting. An ignition source—usually an ignition spark plug—which projects into the prechamber ignites the mixture which is present therein and which in the case of a flashed prechamber is relatively rich, whereby ignition flares pass from the prechamber into a main combustion chamber and ignite the mixture there.

There are various concepts in regard to the supply of fuel to the prechamber. In the case of an unflashed prechamber mixture is urged from the main combustion chamber into the prechamber in the compression stroke. In the case of flashed prechambers there is moreover the possibility of additionally supplying the prechamber with fuel. The fuel which is fed to the prechamber in case of a flashed prechamber can correspond to that in the main combustion chamber or can be different therefrom (in regard to its chemical composition and/or in regard to its air excess number). That separate fuel supply is effected by way of a prechamber gas valve which can be arranged in the cylinder head directly or indirectly (by way of a spark plug sleeve). Hereinafter, that fuel which is fed to the prechamber by way of the prechamber gas valve is referred to as propellant gas.

A cylinder head of the general kind set forth is shown for example in EP 3 064 755 A1. That specification discloses a cylinder head having a cavity for receiving a prechamber gas valve arranged in the cylinder head indirectly by way of a spark plug sleeve. The prechamber gas valve is connected to a prechamber by way of an inclinedly arranged flow transfer passage, wherein in operation of the internal combustion engine propellant gas is fed to the prechamber by way of that flow transfer passage. A similar concept of a flow transfer passage is known from EP 3 061 939 A1.

By EP 3 012 444 A1 a configuration of a flow transfer passage is known which is implemented by a horizontal and a vertical bore for supplying the prechamber with propellant gas coming from the prechamber gas valve.

In addition, by EP 3 012 431 A1 it is known to provide a ring passage connected to the prechamber gas valve by way of a flow transfer passage. The ring passage extends around the prechamber and is connected to the prechamber by a plurality of bores spaced radially from each other. The plurality of bores provides that the propellant gas (coming from the prechamber gas valve by way of the flow transfer passage) is introduced as uniformly as possible into the prechamber and is there distributed with a concentration which is as uniform as possible.

In a combustion cycle of the internal combustion engine, propellant gas is fed to the prechamber by way of the flow transfer passage by the prechamber gas valve, thereby resulting in the prechamber in a propellant gas-air mixture (more precisely that propellant gas-air mixture is mixed in the prechamber with a fuel-air mixture which passes into the prechamber from the main combustion chamber during the compression stroke). Then, in the main combustion chamber, the fuel-air mixture supplied thereto is compressed in a compression stroke until ignition is triggered in the prechamber by a spark plug projecting thereinto. The propellant gas-air mixture ignited in the prechamber forms ignition flares which pass from the prechamber into the main combustion chamber and initiate combustion in the main combustion chamber.

In general, the endeavor is to arrange the prechamber gas valve as closely as possible to the prechamber as the propellant gas in the flow transfer passage is not burnt or is only inadequately burnt during combustion. However, that partial or inadequate combustion of the propellant gas in the flow transfer passage leads to an unwanted increase in the emissions, in particular the HC emissions. The amount of propellant gas which is unburnt or insufficiently burnt in the flow transfer passage can be reduced by reducing the length of the flow transfer passage and consequently moving the prechamber gas valve closer to the prechamber.

By virtue of ignition in the prechamber and combustion of the propellant gas-air mixture in the prechamber, the propellant-air mixture which is present in the flow transfer passage is also ignited, which can result in the formation of combustion residues. Combustion residues in the form of deposits at the peripheral surface of the flow transfer passage and/or the prechamber gas valve have a very negative effect as just minor deposits in the flow transfer passage by virtue of its small cross-section or at the prechamber gas valve are sufficient to partially or even completely block the passage.

BRIEF DESCRIPTION

The object of the invention is to provide a cylinder head which is improved over the state of the art as well as an internal combustion engine having such a cylinder head.

That object is achieved by a cylinder head having the features of claim 1 and an internal combustion engine having such a cylinder head.

In a cylinder head according to the invention, a prechamber gas valve is fitted into a cavity of the cylinder head, wherein the prechamber gas valve is connected to the prechamber by way of a flow transfer passage, wherein the flow transfer passage for a given cross-sectional area immediately downstream of the prechamber gas valve is of such a length that in operation of the cylinder head mounted in an internal combustion engine in a compression stroke of the combustion process propellant gas flow out of the prechamber gas valve forms a gas cushion in the flow transfer passage at least in a first portion that adjoins the prechamber gas valve.

The propellant gas cushion does not have any oxygen component as the propellant gas has not yet mixed with air. Due to the absence of an oxygen component of the propellant gas cushion, it does not take part in the reaction (combustion) and thus no products of incomplete combustion (HC emissions) can be formed by the propellant gas cushion.

The provision of a flow transfer passage of such a length and such a cross-sectional area that the issuing propellant gas forms a gas cushion in the flow transfer passage, ensures at least in the first portion of the flow transfer passage that combustion residues do not settle in the form of deposits at the peripheral surface or the formation of such deposits is at least reduced. Any deposits which nonetheless are formed at the peripheral surface of the flow transfer passage can be entrained by the through flow of the flow transfer passage by virtue of a subsequent expansion phase in the combustion cycle (in which the highest speeds in the through flow in the flow transfer passage occur, at least in the second portion of the flow transfer passage), and thus the flow transfer passage can be cleaned.

In addition, combustion within the flow transfer passage is prevented by the gas cushion consisting of propellant gas as the gas cushion comprises almost pure propellant gas and cannot be ignited due to the absence of oxygen. The gas cushion formed in that way from propellant gas forms so-to-speak a combustion barrier in the flow transfer passage. In other words, the geometrical configuration of the flow transfer passage uses the propellant gas, which is already present, to prevent the creation of deposits in the flow transfer passage near the prechamber gas valve by not allowing combustion.

Advantageous embodiments of the invention are defined in the appendant claims.

Preferably, it is provided that the flow transfer passage with respect to the cross-sectional area immediately downstream of the prechamber gas valve is of an equivalent length of about 15 to about 23 mm, preferably an equivalent length of about 16 to about 20 mm.

In that respect, the equivalent length is calculated from a volume of the flow transfer passage, that is required to form a sufficient gas cushion before the prechamber gas valve during combustion. That equivalent length is thus to be interpreted as a measurement in respect of a substitute volume. The equivalent length is not necessarily an actually implemented structural size, but specifies a length which is to be provided if the flow transfer passage were to be constructed with a constant cross-sectional area, which cross-sectional area would correspond to the cross-sectional area immediately downstream of the prechamber gas valve (that gives the substitute volume—equivalent length multiplied by the cross-sectional area immediately downstream of the prechamber gas valve). The actually structurally provided length of the transfer flow passage results from that substitute volume (equivalent length multiplied by the cross-sectional area immediately downstream of the prechamber gas valve) and the cross-sectional variation along the flow transfer passage.

In other words, the equivalent length is the length of a notional passage which is of the same volume as the actual flow transfer passage, but throughout is of that cross-sectional area of the flow transfer passage, that is immediately downstream of the prechamber gas valve.

It can preferably be provided that the flow transfer passage further has a second portion into which the first portion opens and which extends at least around a part of a periphery of the prechamber around same, wherein the second portion has an uninterrupted peripheral surface apart from that opening with which it passes into the prechamber.

Particularly, preferably, it can be provided that the second portion extends in an angular range of about 20° to about 270°, preferably in an angular range of about 60° to about 180° around the prechamber (360° corresponds to a full circle). Accordingly, it is possible to provide a prolongation of the flow transfer passage in a particularly compact and space-saving fashion. In that case, the flow transfer passage can extend in a circular path around the prechamber or approach the prechamber in a spiral shape. Depending on the respective demands involved, the flow transfer passage can open into the prechamber radially, tangentially or along a secant, in which case it is possible to open-loop/closed-loop control or influence the flow into and the flow through the prechamber.

In one embodiment, a spark plug can be provided as the ignition source in the cylinder head. In that case, commercially usual spark plugs can be used. To accommodate the spark plug in the cylinder head, there can be a spark plug sleeve in the cylinder head.

It can be provided that the second portion extends in a plane parallel to a separation plane between prechamber and the rest of the cylinder head, preferably between prechamber and spark plug sleeve. Such a provision of the second portion of the flow transfer passage provides a particularly simple and resource-sparing option for the production of the second passage. Thus, at least the second portion can be formed by at least one preferably milled groove in a wall of the prechamber and/or the rest of the cylinder head. In the assembled state in that case, the flow transfer passage is formed by the groove in a wall of the prechamber and/or the rest of the cylinder head and a wall adjoining that groove.

Consequently, it can be provided that the flow transfer passage is formed both by a wall of the prechamber and also by material of the rest of the cylinder head.

It is preferably provided that a cross-sectional area of the flow transfer passage, preferably at least over the length of the first portion, is between about $1 \cdot \pi$ mm$^2$ and about $2.5^2 \cdot \pi$ mm$^2$. It can, however, also be provided that the flow transfer passage is of a cross-section which varies over its length. Thus, for example, in certain regions of the flow transfer passage, there can be provided a cross-section narrowing to achieve a throttle effect. Or, it can, for example, be provided a cross-sectional enlargement (or also a space) in certain regions of the flow transfer passage to form a collecting location (for example for a gas cushion). The flow speed of the propellant gas can be specifically open-loop/closed-loop control by a progressive narrowing or enlargement of the flow transfer passage.

In one embodiment, it can be provided that a total (structural) length of the flow transfer passage is between about 30 mm and about 70 mm. However, the length of the flow transfer passage can be selected in dependence on the size of an internal combustion engine, the size of a combustion chamber, or the size of the cylinder head.

It can preferably be provided that the flow transfer passage, preferably the first portion, has a portion inclined substantially relative to a separation plane between prechamber and the rest of the cylinder head. In that case, for example, it can be provided that the angle of the flow transfer passage, preferably of the first portion, is 20° to 70° with the axis of symmetry of the prechamber gas valve. Such an inclined configuration (at least of the first portion) of the flow transfer passage makes it possible to achieve particularly high mechanical stability of the cylinder head. Also, the fluidic flow configuration of the supplied propellant gas is optimized by virtue of the fact that it does not have to flow through any acute angles. For the production of such a gas passage, it can be provided that a flank of the cylinder head is arranged inclinedly. That, for example, can be so selected that the inclined flank is at a right angle to the axis of the flow transfer passage. That facilitates production of the flow transfer passage by boring. Particularly, preferably, it can be provided that the angle of the flow transfer passage relative to the axis of symmetry of the valve body is 20° to 30°.

It can be provided a space between a seat of the valve head of the prechamber gas valve and a mouth opening of the prechamber gas valve into the flow transfer passage. That is the case if the valve head of the prechamber gas valve does not directly adjoin the prechamber or the flow transfer passage leading to the prechamber, but a hollow space is formed therebetween. The provision of that space provides for a particularly good flow of the propellant gas out of the prechamber gas valve into the flow transfer passage.

It can preferably be provided that the space is of a very substantially pear-shaped configuration, which tapers towards the prechamber. In that way, the flow of propellant gas out of the prechamber gas valve into the flow transfer passage can be desirably influenced and nonetheless the volume can be kept small.

Protection is further claimed for an internal combustion engine, in particular a stationary internal combustion engine, having at least one cylinder head according to the invention.

The invention can preferably be used in a stationary internal combustion engine or for marine applications or for mobile applications like so-called "non-road mobile machinery" (NRMM)—preferably each in the form of a reciprocating piston engine (preferably a gas engine). The internal combustion engine can serve as a mechanical drive, for example, for driving compressor installations or can be coupled to a generator to form a genset for generating electrical power.

BRIEF DESCRIPTION OF THE DRAWINGS

Embodiments of the invention are described with reference to the drawings in which.

DETAILED DESCRIPTION

Figure 2:
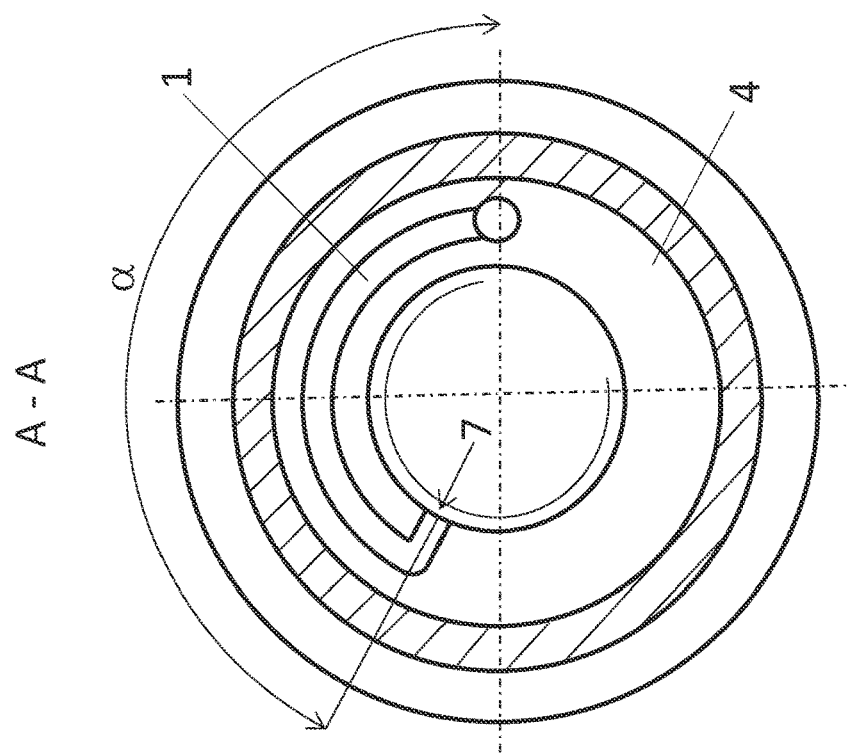
FIG. 2 shows the cross-section indicated in FIG. 1.
Figure 1:
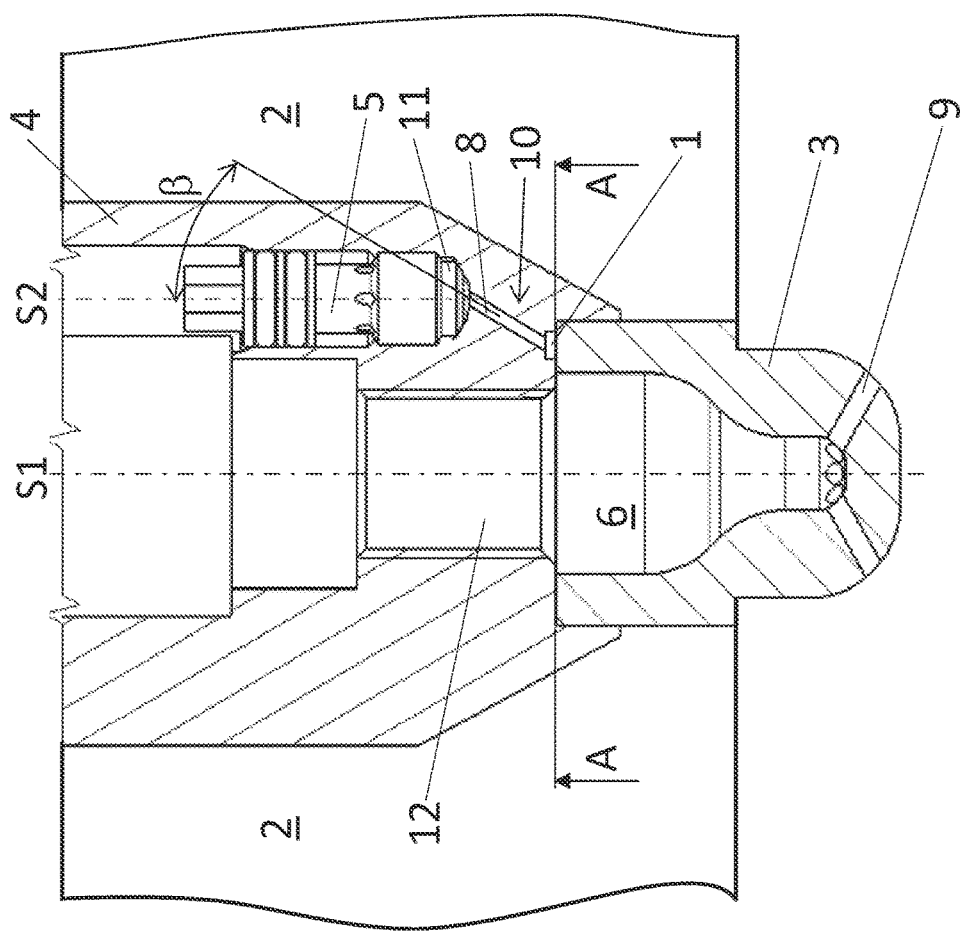
FIG. 1 shows a first embodiment of a cylinder head.

FIGS. 1 and 2 show a first embodiment of a cylinder head 2 for an internal combustion engine having a prechamber 3. The prechamber gas valve 5 and a spark plug (not shown for reasons of clarity) are fitted in a spark plug sleeve 4. In the installation position, the spark plug sleeve 4 is fitted into the cylinder head 2 of the internal combustion engine (not shown here in its entirety).

FIG. 1 shows a longitudinal section through the cavity of the cylinder head 2 into which the spark plug sleeve 4 is fitted. The spark plug sleeve 4 includes a shaft which is concentric around the axis of symmetry S1 and comprises cylindrical portions for receiving a spark plug and it has a bore with the axis of symmetry S2 for receiving a prechamber gas valve 5.

A flow transfer passage 10 leads from the prechamber gas valve 5 to the prechamber 3. The prechamber 3 comprises the actual prechamber space 6, that is to say a hollow space in which the ignition of mixture takes place and the flow transfer bores 9, through which the prechamber space 6 is connected to the main combustion chamber (not shown). After ignition in the prechamber space 6, the ignition flares pass into the main combustion chamber by way of the flow transfer bores 9. In the present embodiment, the prechamber 3 is in the form of a component separate from the spark plug sleeve 4 and is connected, for example pressed, to the spark plug sleeve 4.

The spark plug 6 (not shown for the sake of clarity) is screwed into the spark plug sleeve 4 by way of the spark plug bore 12, which is concentric with the axis of symmetry S1, in such a way that it preferably terminates flush with the prechamber 3 and its electrode or electrodes project into the prechamber 3. The prechamber 3 is enriched with propellant gas by the prechamber gas valve 5 by way of the flow transfer passage 10.

It can be clearly seen here how the flow transfer passage 10 is subdivided into a first portion 8 and a second portion 1. The first portion 8 leads from a space 11, which is arranged at the prechamber gas valve 5 and has a closed peripheral surface to the second portion 1 into which the first portion 8 transitions. The first portion 8 in that case is in the form of a bore in the spark plug sleeve 4, which is inclined at an angle β relative to the axis of symmetry S2 or also the axis of symmetry of the valve body.

FIG. 2 shows the section A-A indicated in FIG. 1 through the separation plane between the prechamber 3 and the spark plug sleeve 4. That section makes it possible to see the second portion 1 of the flow transfer passage 10, which extends in an angular range α around a part of a periphery of the prechamber 3, wherein the second portion 1 (apart from that opening 7 with which it opens into the prechamber space 6) has an uninterrupted peripheral surface. For the sake of clarity, the cylinder head 2 is not shown in this Figure. In this embodiment, the second portion 1 of the flow transfer passage 10 is provided by a milled groove in the spark plug sleeve 4, which is closed by the adjoining wall of the prechamber 3 and forms a passage (second portion 1 of the flow transfer passage 10).

Figure 4:
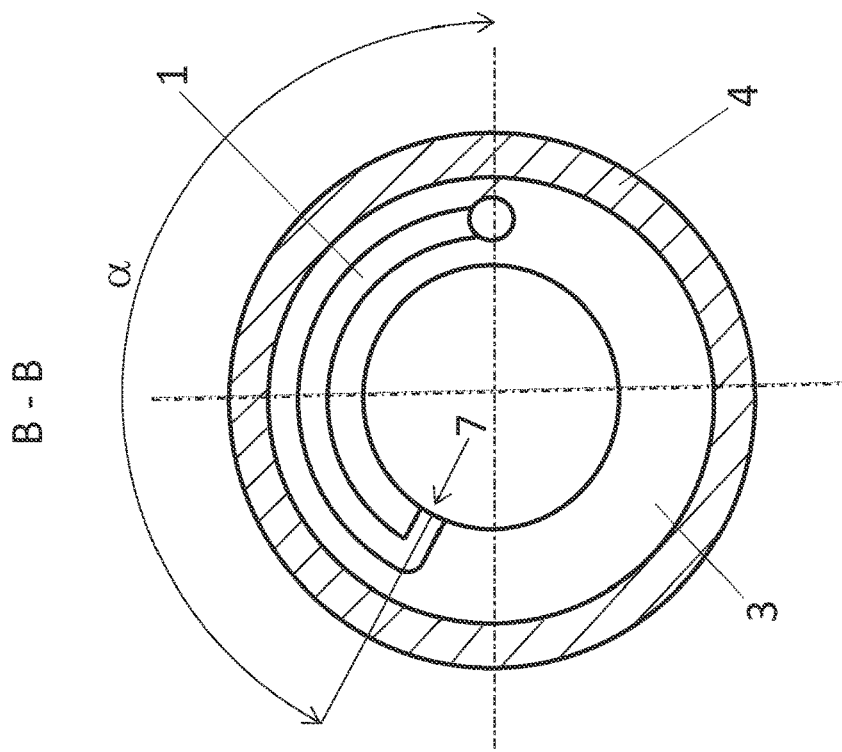
FIG. 4 shows the cross-section indicated in FIG. 3.
Figure 3:
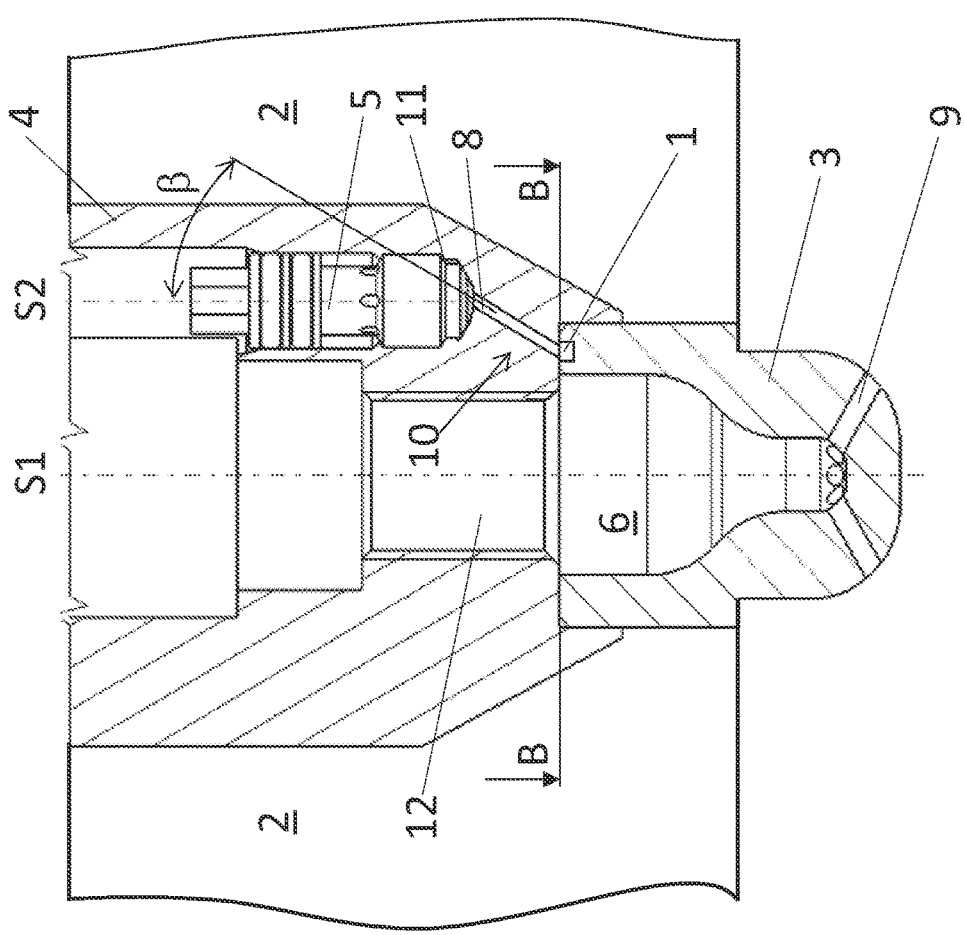
FIG. 3 shows a second embodiment of a cylinder head.

FIGS. 3 and 4 show a second embodiment of a cylinder head 2 for an internal combustion engine. Unlike FIGS. 1 and 2, in the embodiment of FIGS. 3 and 4 the second portion 1 of the flow transfer passage 10 is provided in the prechamber 3. That is particularly clear from FIG. 3. FIG. 4 in turn shows the section B-B indicated in FIG. 3 through the separation plane between the prechamber 3 and the spark plug sleeve 4.

In FIGS. 3 and 4, the second portion 1 of the flow transfer passage 10 extends in an angular range α around a part of a periphery of the prechamber 3, wherein the second portion 1 (apart from that opening 7 with which it opens into the prechamber space 6) has an uninterrupted peripheral surface. In this embodiment, the second portion 1 of the flow transfer passage 10 is provided by a milled groove in the prechamber 3, that is closed by the adjoining wall of the spark plug sleeve 4 and forms a passage (second portion 1 of the flow transfer passage 10).

Figure 6:
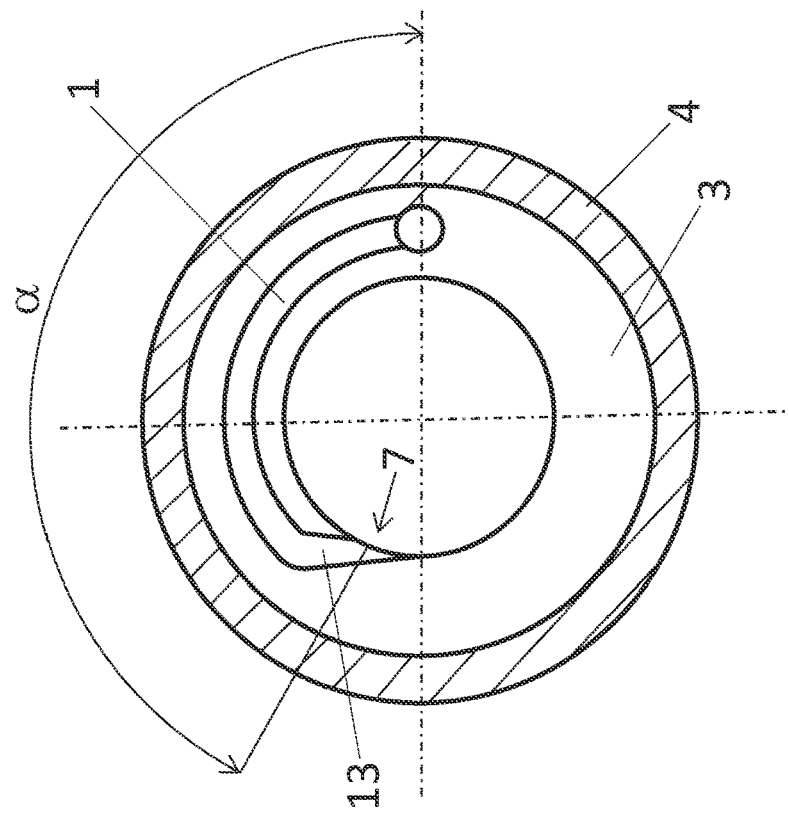
FIG. 6 shows a further alternative embodiment to FIG. 4.
Figure 5:
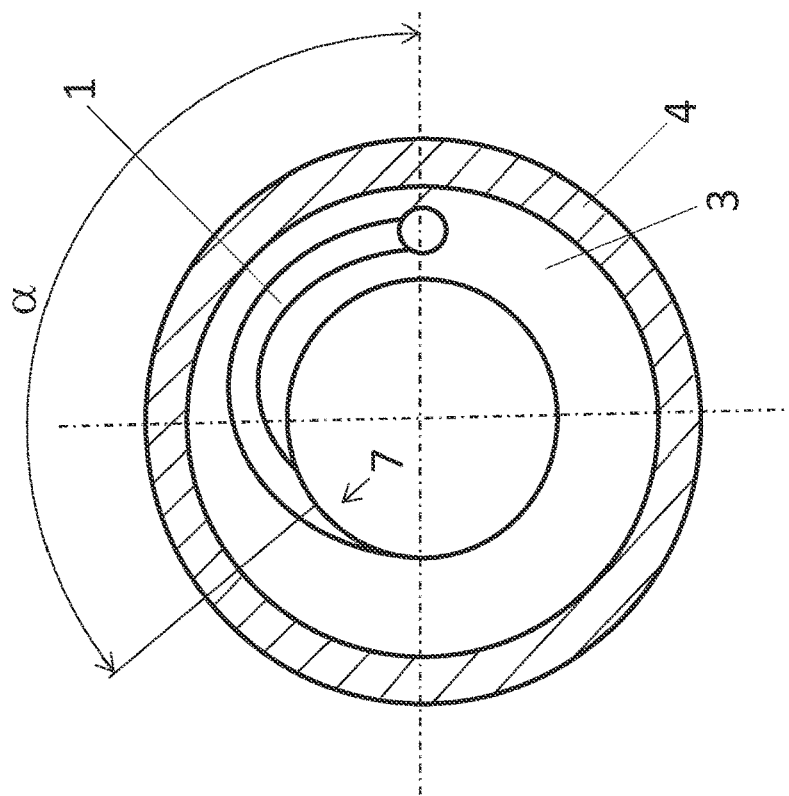
FIG. 5 shows an alternative embodiment to FIG. 4.

FIGS. 5 and 6 show alternative embodiments of the second portion 1 of the flow transfer passage 10 in the same cross-section B-B as also shown by FIG. 4, that cross-section being defined by FIG. 3. These embodiments, however, can also be designed analogously in relation to the embodiment shown in FIG. 1.

FIG. 5 shows an embodiment in which the second portion 1 of the flow transfer passage 10 opens tangentially into the periphery of the prechamber space 6 with the opening 7. By virtue of the variation in the entry angle of the flow transfer passage 10, more precisely its second portion 1, into the prechamber space 6, it is possible to closed-loop/open-loop control flooding of the prechamber 3 by the propellant gas. The second portion 1 of the flow transfer passage 10 is formed by a milled groove in the prechamber 3.

The embodiment shown in FIG. 6 has a second portion 1 of the flow transfer passage 10, that has a cross-sectional narrowing 13 before the opening 7 into the prechamber space 6. By virtue of the variation in the cross-section of the flow transfer passage 10, more precisely its second portion 1, upstream of the prechamber space 6, it is possible to closed-loop/open-loop control the speed at which the propellant gas flows in. The second portion 1 of the flow transfer passage 10 is again provided by a milled groove in the prechamber 3.

Figure 7:
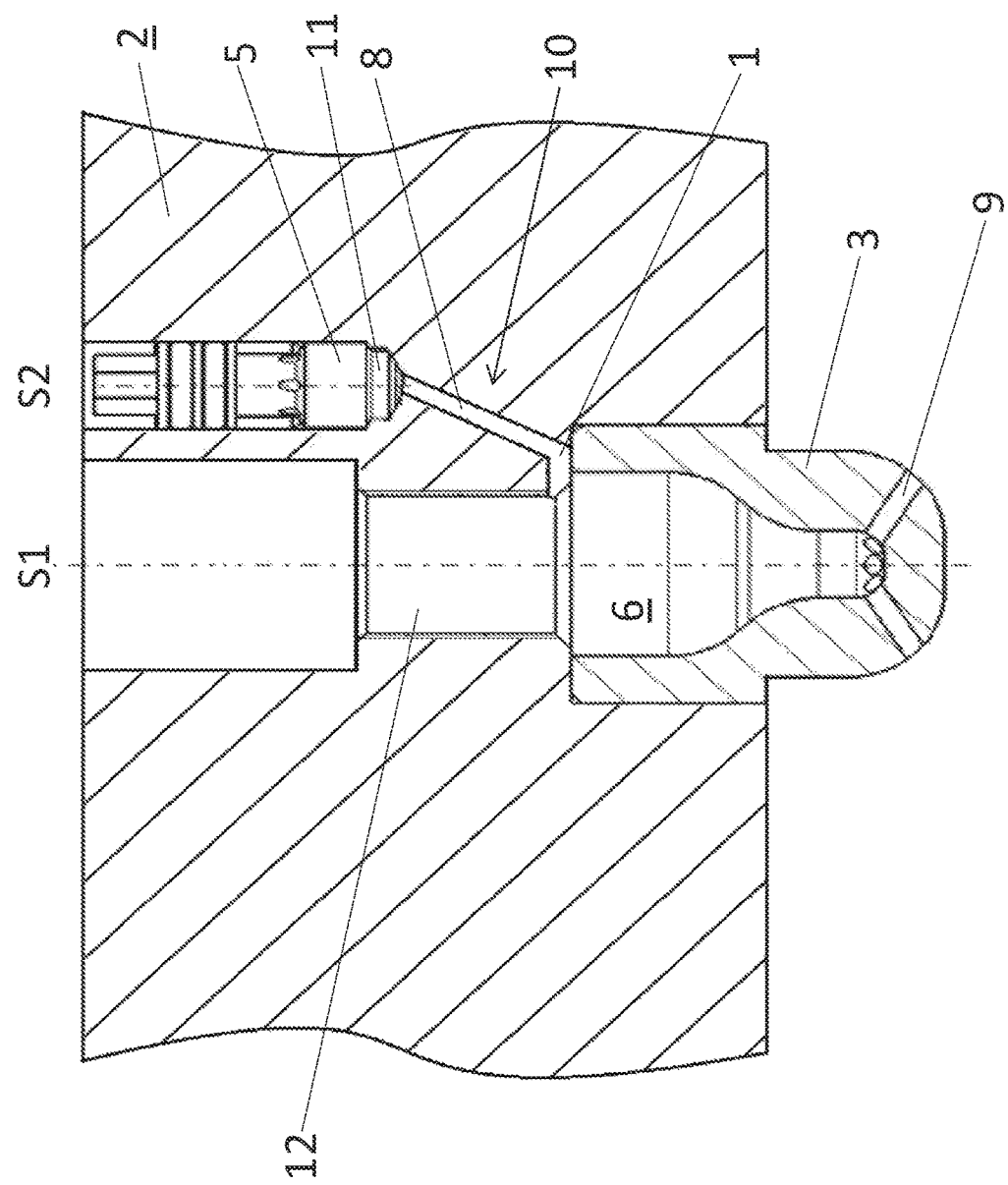
FIG. 7 shows a third embodiment of a cylinder head.

FIG. 7 shows a third embodiment of a cylinder head 2 having a prechamber 3. In the example shown in FIG. 7, however, the prechamber 3 is connected directly to the cylinder head 2 (for example by way of a press fit) without the provision of a spark plug sleeve 4. The flow transfer passage 10 between the prechamber gas valve 5 and the prechamber space 6 has a first portion 8 and a second portion 1. The first portion 8 is provided by a bore in the cylinder head 2, which bore is inclined at an angle β relative to the axis of symmetry S2 and passes the propellant gas out of the space 11 into the second portion 1 of the flow transfer passage 10. The second portion 1 is formed by a straight milled groove in the cylinder head 2, which in combination with the adjoining wall of the prechamber 3, forms a passage.

Figure 8:
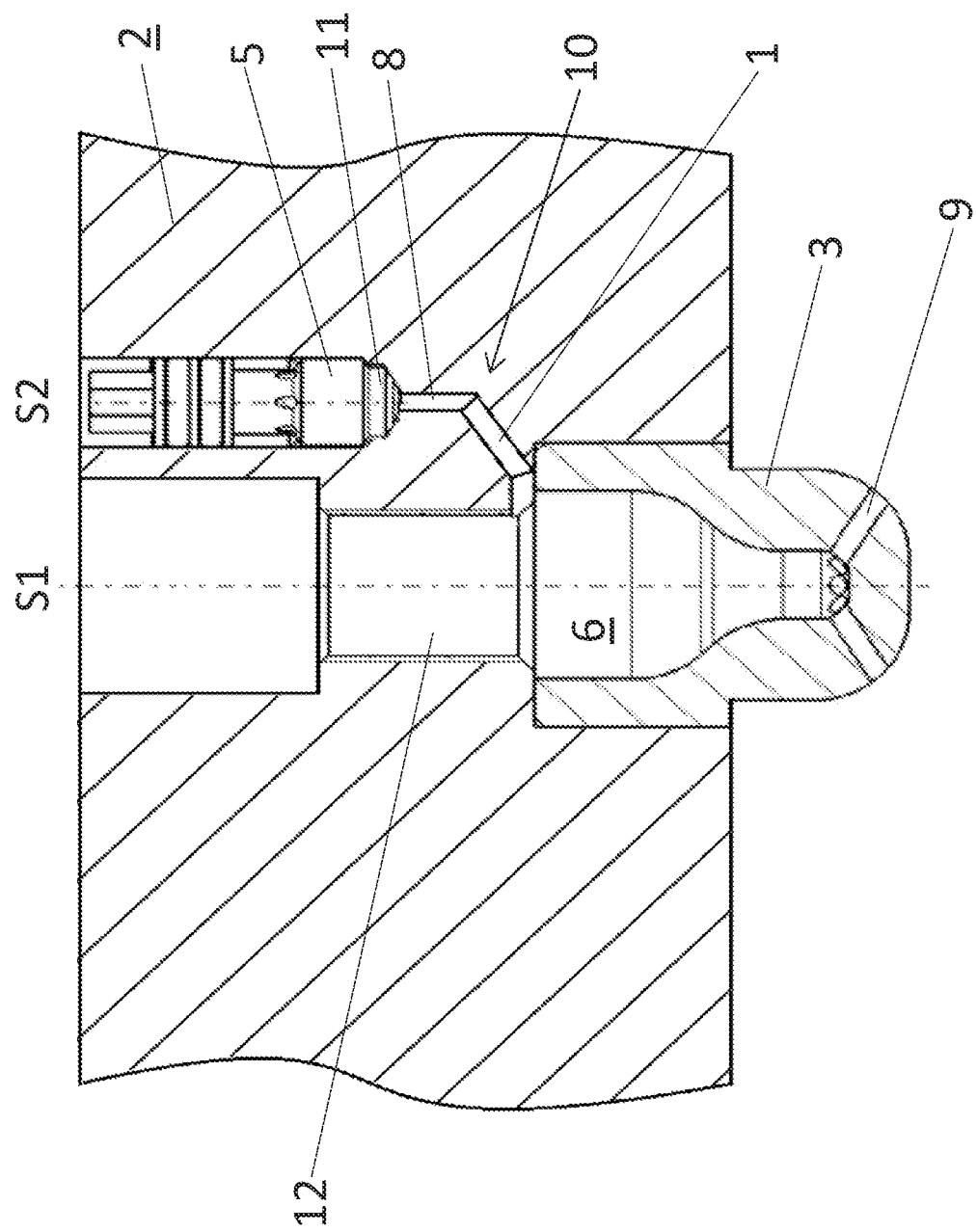
FIG. 8 shows a fourth embodiment of a cylinder head.

FIG. 8 shows a fourth embodiment of a cylinder head 2 having a prechamber 3. Unlike the preceding Figures, the first portion 8 of the flow transfer passage 10 is formed by a perpendicular bore in the cylinder head 2, which extends concentrically relative to the axis of symmetry S2 of the prechamber gas valve 5 and the space 11. Adjoining the first portion 8 of the flow transfer passage 10, there follows the second portion 1 formed by an inclined bore and a groove milled in the cylinder head 2.

Figure 9:
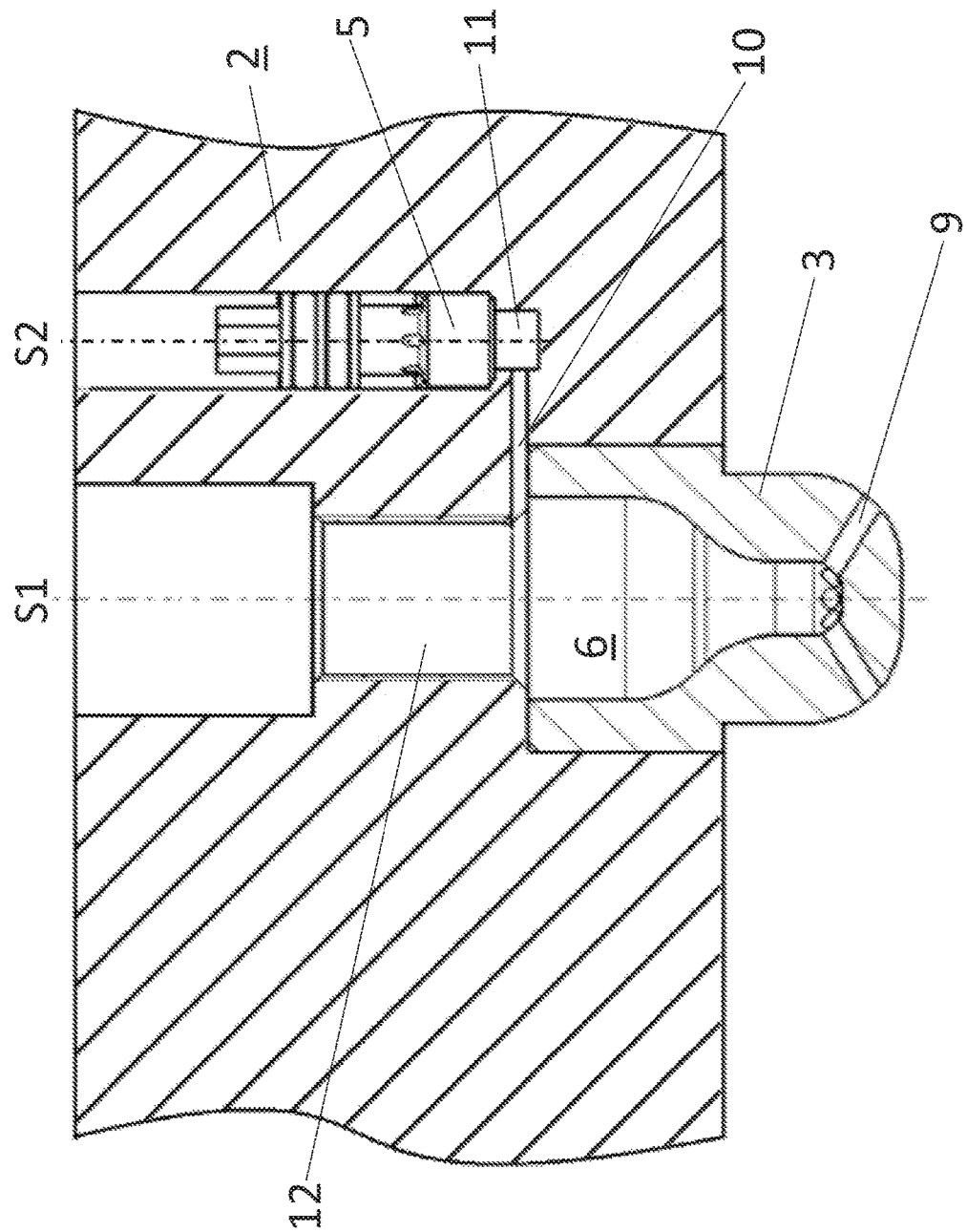
FIG. 9 shows a fifth embodiment of a cylinder head.

The embodiment shown in FIG. 9 only has a continuous connecting bore between prechamber space 6 and the space 11 of the prechamber gas valve 5, representing the flow transfer passage with its first portion 8 and its second portion 1. This embodiment takes up a relatively large amount of space in comparison with the previously described embodiments and is, therefore, only to be used in situations involving a generous amount of space.

LIST OF REFERENCES 1 second portion
2 cylinder head
3 prechamber
4 spark plug sleeve
5 prechamber gas valve
6 prechamber space
7 opening
8 first portion
9 connecting passage
10 flow transfer bores
11 space
12 spark plug bore
13 cross-sectional narrowing
S1 axis of symmetry
S2 axis of symmetry
α angular range
β angle

The invention claimed is:

1. A system, comprising:
a cylinder head for an internal combustion engine comprising a prechamber, wherein a prechamber gas valve is fitted into a cavity of the cylinder head and the prechamber gas valve is connected to the prechamber by way of a flow transfer passage, wherein the flow transfer passage is configured to supply a propellant gas flow into the prechamber, wherein the flow transfer passage has a volume sufficient to form a gas cushion at least in a first portion of the flow transfer passage, wherein the first portion adjoins the prechamber gas valve, wherein the flow transfer passage has a second portion disposed between the first portion and the prechamber, wherein the second portion extends along a periphery of the prechamber over an angular range (α) about a central axis, wherein the angular range (α) is less than 360 degrees, wherein the second portion has an uninterrupted peripheral surface except for an opening between the second portion and the prechamber, wherein the opening is coincident with an interior surface of the prechamber.

2. The system of claim 1, wherein the volume of the flow transfer passage is at least a length times a cross-sectional area immediately downstream of the prechamber gas valve, wherein the length is 15 to 23 mm.

3. The system of claim 1, wherein the cylinder head comprises a spark plug disposed in a spark plug sleeve.

4. The system of claim 1, wherein the angular range (α) of the second portion is only between 20° to 270°.

5. The system of claim 1, wherein a cross-sectional area of the flow transfer passage, at least over a length of the first portion, is between $1\pi$ mm$^2$ and about $2.5^2\pi$ mm$^2$.

6. The system of claim 1, wherein a total length of the flow transfer passage is between 30 mm and 70 mm.

7. The system of claim 1, wherein at least the second portion of the flow transfer passage is disposed between a first surface of the prechamber and a second surface of the cylinder head.

8. The system of claim 1, wherein at least half of a total length of the first portion of the flow transfer passage is inclined substantially relative to a separation plane between the prechamber and the cylinder head.

9. The system of claim 1, wherein the second portion of the flow transfer passage terminates at the opening.

10. The system of claim 1, wherein the flow transfer passage is of a cross-section varying over its length.

11. The system of claim 1, comprising the internal combustion engine having the cylinder head.

12. A method, comprising:
forming a flow transfer passage in a portion of a cylinder head of an internal combustion engine, wherein the flow transfer passage is disposed between a prechamber gas valve and a prechamber space of a prechamber, wherein the flow transfer passage is configured to flow a propellant gas from the prechamber gas valve to the prechamber space during an operation of the cylinder head mounted in the internal combustion engine in a compression stroke of a combustion process, wherein a length and a cross-sectional area of the flow transfer passage downstream of the prechamber gas valve is configured such that the propellant gas forms a gas cushion during the operation of the cylinder head, wherein the flow transfer passage comprises a first portion and a second portion, wherein the first portion is disposed adjacent the prechamber gas valve and the second portion is disposed between the first portion and the prechamber space, wherein the second portion extends along a periphery of the prechamber space over an angular range (α) about a central axis, wherein the angular range (α) is less than 360 degrees, wherein the second portion has an uninterrupted peripheral surface except for an opening between the second portion and the prechamber, wherein the opening is coincident with an interior surface of the prechamber.

13. The method of claim 12, wherein the angular range (α) of the second portion is only between 20° to 270°.

14. The method of claim 13, wherein at least half of a total length of the first portion of the flow transfer passage is inclined substantially relative to a separation plane between the prechamber and the cylinder head.

15. A system, comprising:
- at least a portion of a cylinder head of an internal combustion engine, wherein the portion comprises a flow transfer passage disposed between a prechamber gas valve and a prechamber space of a prechamber, wherein the flow transfer passage is configured to flow a propellant gas from the prechamber gas valve to the prechamber space during an operation of the cylinder head mounted in the internal combustion engine in a compression stroke of a combustion process, wherein a length and a cross-sectional area of the flow transfer passage downstream of the prechamber gas valve is configured such that the propellant gas forms a gas cushion during the operation of the cylinder head,
- wherein the flow transfer passage comprises a first portion and a second portion, wherein the first portion is disposed adjacent the prechamber gas valve and the second portion is disposed between the first portion and the prechamber space, wherein the second portion extends along a periphery of the prechamber space over an angular range (α) about a central axis, wherein the angular range (α) is less than 360 degrees,
- wherein a volume of the flow transfer passage is at least a length dimension times the cross-sectional area immediately downstream of the prechamber gas valve, wherein the length dimension is 15 to 23 mm,
- wherein the cross-sectional area of the flow transfer passage, at least over a first length of the first portion, is between $1\pi$ mm$^2$ and about $2.5^2\pi$ mm$^2$,
- wherein a total length of the flow transfer passage is between 30 mm and 70 mm.

16. The system of claim 15, wherein the angular range (α) of the second portion is only between 20° to 270°.

17. The system of claim 15, wherein the at least half of a total length of the first portion of the flow transfer passage is inclined substantially relative to a separation plane between the prechamber and the cylinder head.

18. The system of claim 15, wherein the second portion of the flow transfer passage extends over the angular range (α) in only one circumferential direction from the first portion.

19. The system of claim 15, wherein the second portion of the flow transfer passage comprises a spiral shape.

* * * * *